Sept. 8, 1959 S. SCHNEIDER 2,903,601

TRANSISTOR-MAGNETIC CORE RELAY COMPLEMENTING FLIP FLOP

Filed March 29, 1957 2 Sheets-Sheet 1

INVENTOR.
STANLEY SCHNEIDER
BY
Walter Schilpp
ATTORNEY

Sept. 8, 1959 S. SCHNEIDER 2,903,601

TRANSISTOR-MAGNETIC CORE RELAY COMPLEMENTING FLIP FLOP

Filed March 29, 1957 2 Sheets-Sheet 2

INVENTOR.
STANLEY SCHNEIDER
BY
J. Walter Schilpp
ATTORNEY

United States Patent Office 2,903,601
Patented Sept. 8, 1959

2,903,601

TRANSISTOR-MAGNETIC CORE RELAY COMPLEMENTING FLIP FLOP

Stanley Schneider, Newtown Square, Pa., assignor to Burroughs Corporation, Detroit, Mich., a corporation of Michigan Application March 29, 1957, Serial No. 649,356
7 Claims. (Cl. 307—88)

This invention relates to a bistable circuit and particularly to a transistor-magnetic core relay complementing flip flop useful in digital computers.

As is well known, a flip-flop circuit will remain in either one of its two stable states until caused to change to its other state by some external force, as by the application of a proper signal. Flip-flop circuits may be either non-complementing or complementing.

A non-complementing flip flop has two input terminals and will change its state in response to a pulse of given polarity applied to one, but not to the other, of its two input terminals; if such a pulse be applied to its other terminal, the flip flop will remain in its resident state.

A complementing flip flop, on the other hand, requires but a single input terminal and in response to a proper applied pulse will change to its other state irrespective of which one of its two states it was in at the time of the application of the pulse.

A non-complementing flip flop may be converted into a complementing flip flop by the addition of steering or inhibit gates which function to pass the externally applied pulse, or a signal derived therefrom, to that particular one of the two input terminals of the otherwise non-complementing flip-flop circuit which will cause the flip flop to change its state and to inhibit application of a signal to the other input terminal. For example, in one form of complementing flip flop, two gates are employed, one of which at any one time is "enabled" and the other of which is "disabled" according to the state of the flip flop. The gate which is connected to that one of the two input terminals of the flip flop per se, which in response to a signal will cause the flip flop to switch, is made enabled; the other is disabled. The externally applied pulse, which may be referred to as the input pulse, is applied to both gates but only the enabled gate passes a signal; the disabled gate inhibits passage of any signal. The signal passed by the enabled gate is effective, in the absence of a signal through the disabled gate, to change the flip flop to its other state.

In such a device as the above, some means must be provided which in response to the change of state of the flip flop, or in response to some subsequent event, is effective to reverse the status of the gates in anticipation of the arrival of the next input pulse; that is, some means must be provided to disable the enabled gate and to enable the disabled gate prior to the application of the next input pulse.

In those complementing flip flops wherein the status of the gate is reversed in response to the change of state of the flip flop, it will be seen that if the gates were permitted to reverse their status prior to the termination of the input pulse, the gate which was disabled at the start of the input pulse would now be enabled and in response to the continuing input pulse would pass a signal to the flip flop per se which would again change its state, i.e., would return the flip flop to the state it was in at the time the input pulse was first applied. Thus, the flip flop would continue to change state in an oscillatory manner as long as the input pulse were present and the final state of the flip flop would be a function of the duration of the input pulse. This action is known as time race.

It is an object of the present invention to provide a pulse-operated complementing flip-flop circuit which is not subject to time race and which is suitable for storage, gating, counting, and the construction of registers and accumulators in digital computers, data processors and control systems.

Another object is to provide a circuit having the aforesaid capabilities which will operate at high frequencies (of the order of one million pulses per second).

A further object is to provide a circuit of the above type having the ability ot deliver a fast propagated carry pulse.

Another object is to provide a circuit of the above type having non-volatile storage.

These and other objects are accomplished by a transistor-magnetic storage core relay complementing flip-flop circuit. The flip flop is set in one state by an applied D.-C. bias and remains in that state except when the magnetic storage core is switching from the "1" to the "0" state, and then only during the switching period. The state of the flip flop determines the condition of a pair of switches, each of which comprises a pair of transformers, each transformer having a diode in its primary winding. The information stored in the core is read out by means of a pair of pulses, the first of which is applied directly to a control unit and the second of which is applied to the unit through one of the switches. The pulses of the pair are spaced in time by an interval which is not greater than the switch-time of the system. If the core is in the "0" state at the time the first pulse of the pair is applied, then the core does not switch. The second pulse of the pair then appears at the "0" state output terminal of the switch and is not applied to the control unit. Thus, in the absence of a complementing pulse, pulses will appear at the "0" state output terminal at the rate of application of the pulse pairs. If a complementing pulse be then applied to the other switch, an output pulse will appear at its "sum" terminal. This "sum" pulse is also applied to the control unit to switch the core from the "0" to the "1" state, and thus the core is complemented. When the first pulse of the pulse pair finds the core in the "1" state, it switches it back to the "0" state. The second pulse of the pair arrives during the core-switching operation and finds its switch reversed. This pulse passes to the "1" state output terminal of the switch and is also applied ot a temporary storage unit, a capacitor, in the control unit. The capacitor charges, and this charge is held until termination of the "1"-to-"0" switching operation, after which the charge is used to switch the core back to the "1" state. Thus, the core is maintained in the "1" state by double switching. If, when the core is in the "1" state, and is switching from the "1" to the "0" state in the first stage of the double-switching operation, a complementing pulse be applied to the other switch substantially coincident with the application of the second pulse of a pulse pair to the first switch, the complementing pulse finds its switch reversed, and a pulse appears at the "carry" output terminal. This pulse is also applied to an inhibit circuit included in the control unit to prevent the second pulse of the pulse pair from completing the second stage of the double-switching operation, i.e., to prevent the second pulse from switching the core from the "0" back to the "1" state. Thus, the core remains in the "0" state, and the core is complemented.

While the foregoing is a summary, the invention will be best understood from a consideration of the following detailed description taken together with the drawing wherein:

Fig. 3 is a logical diagram of the same circuit of which Fig. 1 is a mechanization;

Figure 1:
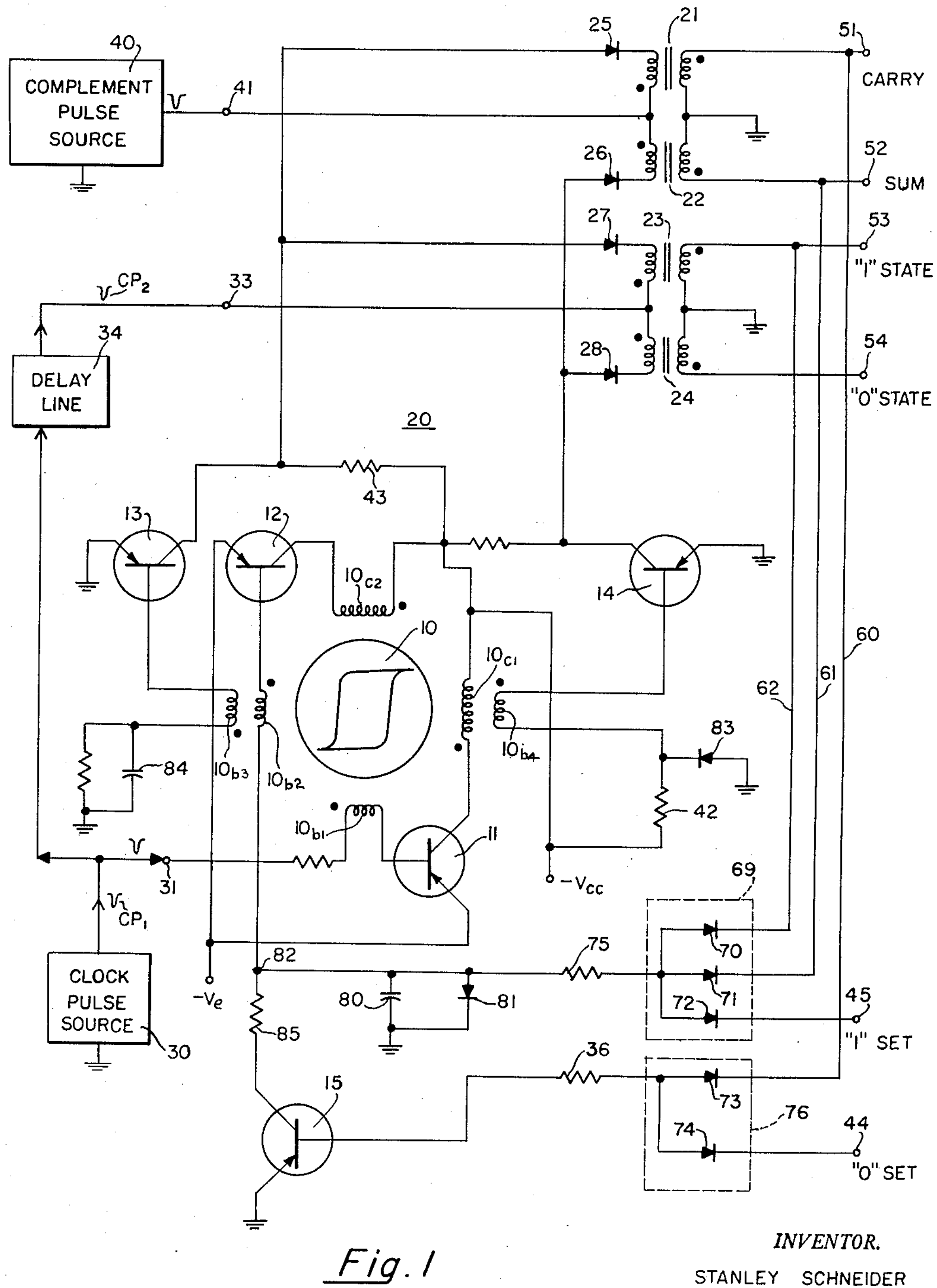
Fig. 1 is a schematic of one form of a relay complementing flip-flop circuit of the present invention.

Referring now to Fig. 1, there is shown a transistor-magnetic core circuit oomprising the square hysteresis loop core 10 and the five transistors 11 to 15 inclusive. The core 10 has six windings identified in Fig. 1 as windings $10_{b1}$, $10_{b2}$, $10_{b3}$, $10_{b4}$, $10_{c1}$, and $10_{c2}$; the four windings bearing the subscript "*b*" are in the base leads of transistors 11, 12, 13 and 14, while the two windings bearing the subscript "*c*" are in the collector leads of transistors 11 and 12.

The collector winding $10_{c1}$ of transistor 11 is regeneratively coupled to its base winding $10_{b1}$; and, similarly, the collector winding $10_{c2}$ of transistor 12 is regeneratively coupled to its base winding $10_{b2}$. The emitters of transistors 11 and 12 are connected to a source of negative D.-C. bias voltage $-V_e$, the purpose of which will be explained in a moment. The application to the base of either transistor 11 or 12 of a negative trigger pulse of sufficient amplitude to overcome the negative emitter bias $-V_e$ will forward bias the base-emitter junction of the transistor and initiate current flow through its collector winding. Assuming the core to be in a remanent state of proper polarity, this initial rise of current in the collector winding causes a flux change in the core 10 which induces a voltage in the base winding of a polarity to increase the forward bias on the base-emitter junction of the transistor. This, in turn, causes an increase in collector current. The action is regenerative and the transistor quickly bottoms, i.e., conducts at saturation. The purpose of the negative emitter bias $-V_e$ is to prevent the voltage induced during flyback in one regenerative circuit from triggering the other regenerative circuit and thereby setting up an oscillatory condition. In practice, it has been found that an emitter bias of about $-1\frac{1}{2}$ volts will prevent oscillation.

Figure 2:
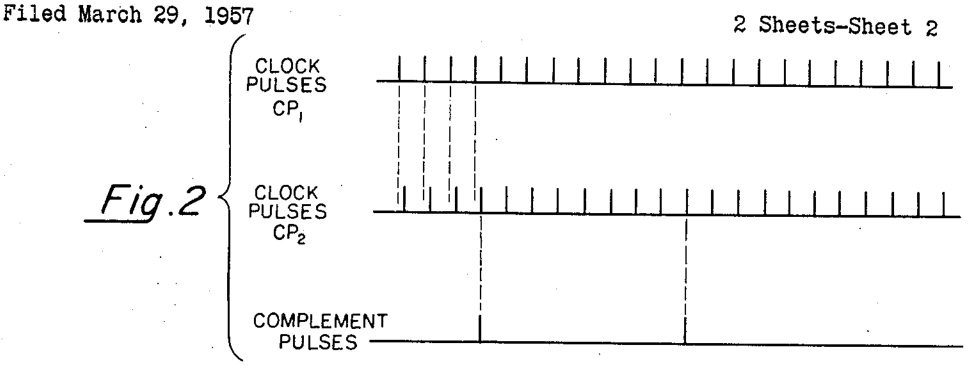
Fig. 2 is a graph showing the time relation among the various pulses applied to the circuit of Fig. 1.

Pulse source 30 supplies negative clock pulses $CP_1$ to the input terminal 31 of the control unit. Pulse source 30 also supplies, by way of delay circuit 34, negative clock pulses to the input terminal 33; the clock pulses at terminal 33 are identified as $CP_2$ and lag the clock pulses $CP_1$ by a time interval which is within the switching time of the relay unit, which may be of the order of 0.5 microseconds. The time relation between the $CP_2$ and $CP_1$ pulses is indicated graphically in Fig. 2.

Pulse source 40 supplies negative pulses to the complementing input terminal 41. It is required that there be a proper time relation between the occurrence of the clock pulses $CP_1$ and $CP_2$ and the complementing pulse applied to the input terminal 41; the requirement is that the complementing pulse occur before the regeneration action initiated by a clock pulse $CP_1$ or $CP_2$ ceases.

The operation of the circuit of Fig. 1 will now be described during which reference will be made to other components and connections not specifically referred to above but clearly shown in Fig. 1.

Before describing the operation of the circuit of Fig. 1 in detail, a few general statements will be made regarding the functions performed by portions of the circuit.

The two transistors 13 and 14 are the analogue of the coil unit of the relay. These two transistors control the pulse transformers 21, 22, 23 and 24 which are the analogue of the relay contacts. The other three transistors 11, 12 and 15, together with the square-loop core 10, form a control unit 20 which controls the relay "contacts" (the transformers 21 to 24) through the agency of the relay "coils" (the transistors 13 and 14). This control is effected by the application of appropriate potentials to the four diodes 25, 26, 27 and 28 which are in series with the primary windings of the four pulse transformers.

The square-loop core 10 is used as the storage unit. The regenerative circuit of transistor 11 is used to read out the information stored in the core, while the regenerative circuit of transistor 12 is used to read information into the storage unit. The information read in is applied through the "1 set Or" gate 69 comprising the paralleled diodes 70, 71 and 72 and may originate either from a $CP_2$ clock pulse, or from a complementing pulse, or from a pulse applied to the "1 set" terminal 45.

Information cannot be read into the core while the regeneration through transistor 11 is reading out the information already stored. Accordingly, some form of auxiliary storage or delay must be included; this is provided by capacitor 80 which stores the $CP_2$ or complementing pulse while the read-out circuit is regenerating.

Transistor 15 functions as an inhibit gate to prevent conflict between a complementing pulse and a $CP_2$ pulse when the core is in the "1" state at the time the pulses are applied.

The "0 set" and "1 set" terminals 44 and 45 are for the application of pulses to set the core 10 to a desired state, as for example, to set the core to a desired state at the start of a period of operation.

With the above-described functions of the various parts of the system of Fig. 1 in mind, consider now in detail the manner in which the system operates.

Figure 4:
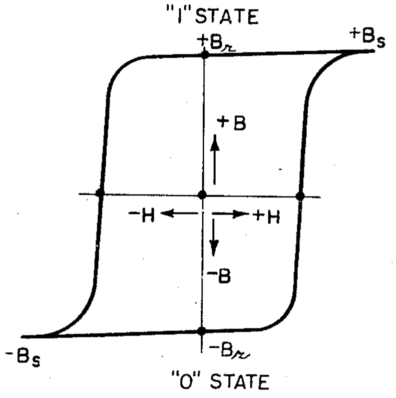
Fig. 4 is an idealized hysteresis loop of the magnetic material used as the storage core in the circuit of Fig. 1.

Assume that when the square core 10 is in the "0" state the flux in the core is at the level of negative residual magnetism identified as $-B_r$ in Fig. 4, and that when the core is in the "1" state the flux is at the level of positive residual magnetism identified in Fig. 4 as $+B_r$.

Figure 5:
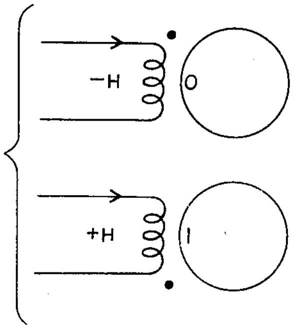
Fig. 5 shows the code assumed with respect to the to the polarity of the magnetizing force established by current flow in a winding.

Assume further that current flowing into the dot terminal of a core winding will establish a magnetizing force $-H$ which will drive the core to the "0" state, and that current flowing into the non-dot terminal will establish a magnetizing force $+H$ which will drive the core to the "1" state. For convenient reference, these assumed conditions are illustrated in Fig. 5.

Assume also, with respect to the pulse transformers 21—24, that current flowing into the dot terminal of a primary winding will induce a voltage in the secondary winding of a polarity to drive current out of the non-dot end of the secondary winding.

Having in mind the foregoing assumptions, consider first the situation when the core 10 is in the "0" state and the control unit 20 is quiescent, that is, neither transistor 11 nor 12 is regenerating. With the control unit 20 quiescent, the base-emitter junction of transistor 14 is forward biased by the negative D.-C. voltage source $-V_{cc}$ applied to the base through the resistor 42 and the base coil $10_{b4}$. Transistor 14 is conducting at saturation and its collector is substantially at the potential of its emitter. Actually, the potential difference between the collector and emitter of the transistor 14, when conducting at saturation, may be of the order of 0.1 volt, but for the purposes of the present discussion this voltage difference is negligible and it will be assumed hereinafter that the potential at the collector of a bottomed transistor is equal to that at the emitter. Since in Fig. 1 the emitter is connected to ground, the collector of transistor 14, when bottomed, is at ground potential. Transistor 13 is non-conducting since there is no forward bias applied to its base-emitter junction. The collector of transistor 13 is, accordingly, at a negative potential $-V_c$ which is slightly less negative than that of the source $-V_{cc}$ due to the small voltage drop across the resistor 43 resulting from the leakage current flowing therethrough.

With transistor 13 cut off and transistor 14 bottomed, the diodes 25 and 27, which are in series with the primary windings of the pulse transformers 21 and 23, respectively, are back biased by the negative potential appearing at the collector of transistor 13, while the diodes 26 and 28, which are in series with the primary windings of the pulse transformers 22 and 24, are zero biased, the anodes being at ground potential.

Under the foregoing conditions, if a negative clock pulse $CP_1$ be applied to terminal 31, the base-emitter junction of the transistor 11 will be forward biased and collector current will flow into the dot terminal of collector winding $10_{c1}$. This current sets up a magnetizing force $-H$ in a direction to set the core 10 to the "0" state, but since the core is already in the "0" state, the flow of current in the collector winding $10_{c1}$ will merely drive the flux level in the core from its "0" remanent state ($-B_r$) toward the negative magnetic saturation point ($-B_s$). The flux change will be very small and consequently the voltage induced in the other windings of core 10 will be small. Such voltages are ordinarily referred to as noise voltages. The noise voltages so induced in the windings of core 10 will be of a polarity tending to drive current out of the dot terminal. Accordingly, in the case of transistor 13 the noise voltage is negative at the base end of winding $10_{b3}$ and is, therefore, of a polarity tending to turn the transistor 13 "on." However, transistor 13 does not turn "on" since the noise voltage induced is too small and is of too short duration. In the case of transistor 14, the noise voltage is positive at the base end of winding $10_{b4}$ and is of a polarity to turn transistor 14 "off." However, transistor 14 does not turn "off" since the noise pulse induced is insufficient to overcome the negative bias voltage supplied to the base of transistor 14 from the negative D.-C. source $-V_{cc}$. Thus, transistor 14 remains conducting and transistor 13 remains cut off.

The negative clock pulse $CP_2$ which arrives at terminal 33 shortly after the application of the clock pulse $CP_1$ to terminal 31, therefore sees the path which includes the primary winding of pulse transformer 24 and the zero-biased diode 28 as a low impedance path, the pulse $CP_2$ setting the diode 28 in its low impedance state. The path which includes the primary winding of pulse transformer 23 and the diode 27 is seen by the pulse $CP_2$ as a high impedance path since the diode 27 is back biased by a voltage from the collector of transistor 13 which is more negative than the peak value of the negative clock pulse. Current accordingly flows in the primary winding of pulse transformer 24, but no appreciable current flows in the primary winding of pulse transformer 23. A voltage is induced in the secondary winding of transformer 24 and an output signal appears at the terminal 54. The signal appearing at terminal 54 is available to external equipment to indicate that a "0" is stored in core 10. So long as no complementing pulses are applied, the system will continue to deliver signals at the "0" output terminal 54 for each clock pulse $CP_2$ applied to terminal 33.

If, now, a negative complementing pulse be applied to the input terminal 41 it will see the path which includes the primary winding of the pulse transformer 22 and the zero-biased diode 26 as a low impedance path, and will see the path which includes the primary winding of the pulse transformer 21 and the reverse-biased diode 25 as a high impedance path. Current will accordingly flow through the primary winding of transformer 22 and a voltage will be induced in its secondary winding of a polarity to drive current into the dot terminal of the winding. A negative pulse signal will, therefore, appear at the terminal 52 which is available to external equipment and which may be used to indicate that the storage core 10 is being shifted from the "0" to the "1" state. The terminal 52 is accordingly identified in Fig. 1 as the "sum" terminal.

As just indicated above, the voltage induced in the secondary, due to the rise of current in the primary winding of transformer 22, is of a negative polarity at the dot end. This voltage drives current through a path comprising the lead 61, the diode 71 of the "1 set Or" gate 69, the current-limiting resistor 75, and the storage capacitor 80. The capacitor starts to charge and as the capacitor charges, the potential at the point 82 goes negative. However, so long as information is being read out, that is, so long as transistor 11 is regenerating in response to a $CP_1$ pulse, the negative voltage developed across storage capacitor 80 is prevented from appearing at the base of transistor 12 by the voltage which is induced in the base winding $10_{b2}$ during the said regenerating action, such induced voltage being positive at the dot end of the winding.

As soon as the regenerating action of transistor 11 ends, thereby terminating the read-out action of the control unit, the negative voltage which has been built up across capacitor 80 is applied through the winding $10_{b2}$ to the base of transistor 12, thereby forward biasing the base-emitter junction of the transistor. Transistor 12 then begins to conduct, collector current flows through the winding $10_{c2}$, and the read-in action, comprising the regenerative action of transistor 12, then takes place. Transistor 12 quickly bottoms and the current flowing through the collector winding $10_{c2}$ establishes a magnetizing force $+H$ which drives the flux in the core 10 from its negative remanent level ($-B_r$) to the positive magnetic saturation point ($+B_s$). See Fig. 4. Core 10 shifts, therefore, from the "0" state, in which it resided, to the "1" state. The flux level in the core then drops back to the positive remanent level ($+B_r$), this change in flux being very small, as will be seen from an inspection of Fig. 4.

When, as a result of the complementing action just described, the square core 10 shifts from the "0" state to the "1" state, the change of flux in the core induces a voltage in each of the core windings of a polarity to drive current out of the non-dot terminals thereof. It will be seen from an examination of Fig. 1 that the voltage so induced in the base winding $10_{b4}$ is of a polarity to maintain the "on" transistor 14 "on," while the voltage induced in the base winding $10_{b3}$ is of a polarity to maintain the "off" transistor 13 "off." And since transistors 13 and 14 are the analogue of the relay coils, the pulse transformer gates 21—24, which are the analogue of the switch contacts, remain unchanged.

The next clock pulse $CP_1$ which is applied to the input terminal 31 finds the core in the "1" state. This pulse turns "on" the transistor 11 and current flows in the collector winding $10_{c1}$. The regenerative action hereinbefore described then takes place, and the transistor 11 quickly bottoms. The collector current flowing through the winding $10_{c1}$ develops a magnetizing force $-H$ which drives the core flux from the positive remanent level $+B_r$, at which it resided, to the negative magnetic saturation point ($-B_s$). Accordingly, the core 10 switches from the "1" state to the "0" state. When this occurs, voltages are induced in each of the core windings of a polarity to drive current out of the dot ends. In the case of winding $10_{b4}$, this induced voltage is positive at the base end and is, therefore, of a polarity to turn the "on" transistor 14 "off," while in the case of the winding $10_{b3}$ the induced voltage is negative at the base end and is therefore of a polarity to turn the "off" transistor 13 "on." As a result, the transistor 14 turns "off" and the transistor 13 turns "on," and the diodes 26 and 28 become reversed biased while the diodes 25 and 27 become zero biased. It will be seen, then, that when the control unit 20 is in energized state due to the core 10 switching from the "1" state to the "0" state, the pulse transformer gates are reversed relative to their condition when the control unit is either quiescent or energized due to the core switching from the "0" to the "1" state.

The next clock pulse $CP_2$ (that is, the $CP_2$ pulse which follows the $CP_1$ pulse which effected the shift of the core 10 from the "1" to the "0" state) accordingly finds the path which includes the primary winding of the transformer 24 and the diode 28 to offer very high impedance and the path which includes the primary winding of the transformer 23 and the diode 27 to offer low impedance. This pulse $CP_2$ therefore drives current through the primary winding of the transformer 23, a voltage is induced in its secondary winding of a polarity to drive current into the dot end thereof, and a negative pulse signal appears at the terminal 53. Since the $CP_2$ pulse now being discussed is about to switch the core 10 from the "0" to the "1" state, as will be described, and since the core 10 was in the "1" state at the time the preceding clock pulse $CP_1$ was applied, the signal developed at terminal 53 may be used to indicate to external equipment that the core is in the "1" state. In other words, a signal at terminal 53 informs the external equipment that a "1" is stored and that a "1" continues to be stored.

Consider now the manner in which the $CP_2$ pulse presently being discussed shifts the core from the "0" state (in which it was placed by the preceding $CP_1$ pulse) to the "1" state. The voltage induced in the secondary of transformer 23 in response to the leading edge of the $CP_2$ pulse is negative at the dot terminal of the secondary winding. This pulse drives current through a path comprising the lead 62, the diode 70 of the "1 set Or" gate 69, the current-limiting resistor 75, and the storage capacitor 80; and the capacitor charges to a negative potential. So long as the regenerating action of transistor 11 continues, the negative voltage developed across storage capacitor 80 will be prevented from appearing at the base of transistor 12 by the positive voltage induced in winding $10_{b2}$, but as soon as the regenerating action of transistor 11 ends, the negative potential at point 82 is applied through the winding $10_{b2}$ to the base of transistor 12 and turns the transistor 12 "on." The regenerative action of transistor 12 then takes place, the transistor 12 bottoms, and the current through collector winding $10_{c2}$ establishes a magnetizing force +H which shifts the core from the "0" to the "1" state.

It will be seen, then, that when the core 10 is in the "1" state at the time of the application of a clock pulse $CP_1$, a pulse signal is developed at the terminal 53 in response to the following $CP_2$ pulse which indicates to external equipment that the core is in the "1" state; and the terminal 53 is accordingly marked the "1" terminal. So long as no complementing pulses are applied to terminal 41, a pulse signal will be delivered from the "1" state terminal 53 for each pair of clock pulses ($CP_1$ and $CP_2$) appied to the input terminals. It is to be noted, however, that during any such period the core 10 is actually switching from the "1" to the "0" state in response to the $CP_1$ pulse, and then switching back from the "0" to the "1" state in response to the following $CP_2$ pulse. Consequently, the control unit 20 is in a substantially continual energized state with transistor 11 regenerating in response to the $CP_1$ pulse and transistor 12 regenerating in response to the $CP_2$ pulse.

Assume now that while the regenerative action of transistor 11 is in progress and the core 10 is shifting from the "1" to the "0" state, a complementing pulse is applied to the terminal 41, either coincident with or shortly after the application of the clock pulse $CP_2$. Such a complementing pulse finds the path which includes the primary winding of transformer 22 and the diode 26 in a high impedance condition and the path which includes the primary winding of transformer 21 and the diode 25 in a low impedance condition. This complementing pulse accordingly drives current through the primary winding of transformer 21, a voltage is induced in its secondary winding which is of a polarity to drive current into the dot terminal of the winding, and a negative signal appears at the terminal 51 where it is available to external equipment to indicate that the storage core 10 is about to be shifted from the "1" state to the "0" state. This signal is, therefore, a fast propagate "carry" signal and terminal 51 may, therefore, be appropriately identified as the "carry" terminal.

The negative "carry" pulse drives current through a path comprising the lead 60, the diode 73 of the "0 set Or" gate 76, and the current-limiting resistor 36 and forward biases the base-emitter junction of transistor 15. Transistor 15 turns "on" and provides a low impedance discharge path for storage capacitor 80. Resistor 85 is for the purpose of limiting the current through the transistor 15. Thus, the negative voltage which is induced at the dot end of the secondary of transformer 23 by the coincident or slightly leading $CP_2$ pulse is prevented from charging storage capacitor 80 to a sufficiently negative potential to turn transistor 12 "on" after the regenerative action of transistor 11 has ceased. Accordingly, transistor 12 remains "off," and core 10 remains in the "0" state.

It will be observed from what has been said thus far that the application of a pulse to complementing input terminal 41 is effective to shift the system of Fig. 1 from its resident state to its other state, irrespective of which state the system is in at the time of the application of the pulse. I will be seen that this complementing action is accomplished by means of the diode-transformer gates which function as steering means to guide the applied complementing pulse, or a signal derived therefrom, to that input terminal of the control system which will cause the flip flop to change its state.

It will be noted that the signal applied to the control system from the secondary of the diode-transformer gate is a signal which is induced in response to the leading edge or ramp portion of the applied $CP_2$ or complement pulse. If the applied pulse be a square pulse, the duration of the fixed amplitude flat top portion is of no consequence so far as time race is concerned since this portion induces no voltage in the secondary. Thus, in the system of the present application, so long as the leading edge or ramp of the applied pulse does not continue for a period longer than the switching time of the system, there is no danger that the flip-flop will change its state several times before the trigger pulse is ended.

If it is desired to set the system of Fig. 1 unconditionally to the "1" state, or to the "0" state, this may be accomplished by the application of a pulse to the "1 set" terminal 45, or to the "0 set" terminal 44, as the case may be. Such pulse should preferably be in synchronism with a $CP_2$ pulse applied to the input terminal 33.

Figure 3:
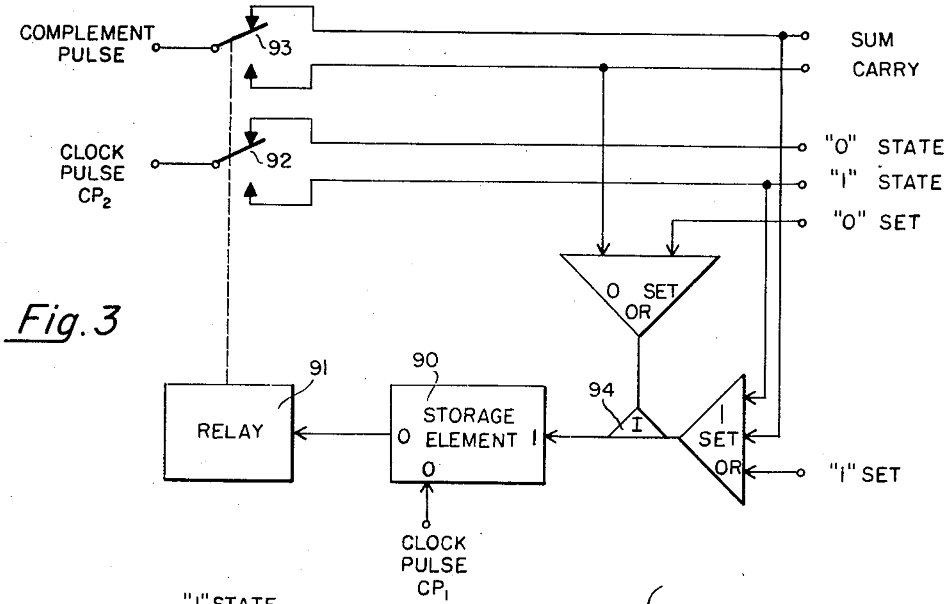

Before referring to the other figure of the drawing, namely, Fig. 3, the functions of those components of Fig. 1 not specifically referred to up to this point will be stated. The diode 83, connected between the non-dot end of winding $10_{b4}$ and ground, serves the purpose of lowering the impedance of the turn-off path for transistor 14. The capacitor 84, connected in the base lead of transistor 13, speeds up the operation of transistor 13. The diode 81, connected across storage capacitor 80, provides a D.-C. path for transistor 12. All resistors shown and not specifically identified are current-limiting resistors.

Referring now to Fig. 3, there is shown the logical equivalent of the circuit of Fig. 1. The storage element 90 in Fig. 3 comprises, in Fig. 1, the core 10 and the circuits of the transistors 11 and 12. The relay 91 in Fig. 3 comprises, in Fig. 1, the transistors 13 and 14. Switch 92 in Fig. 3 comprises in Fig. 1 the pulse transformers 23 and 24 together with their series diodes, and switch 93 comprises the transformers 21 and 22 and their diodes. It is believed that the counterparts in Fig. 1 of the remaining components of Fig. 3 will be readily recognized and that no explanation is required.

In Fig. 3, the application of a $CP_1$ pulse sets the storage element 90 in the "0" state. If the storage element is already in the "0" state when the $CP_1$ pulse is applied, the storage element does not switch; if it is in the "1"

state when the $CP_1$ pulse is applied, the storage element switches. The state of the storage element, with respect to whether it is switching or quiescent, and, if switching, the direction of the switching, controls the condition of the relay. The relay is energized when the storage element is switching from the "1" to the "0" state; the relay is de-energized when the storage element is either not switching or is switching from the "0" to the "1" state. The state of the relay 91 in turn controls the condition of the switches 92 and 93. When the storage element 90 is in the "0" state at the time the $CP_1$ pulse is applied, the storage element does not switch, the relay is not energized, and the upper contacts of switches 92 and 93 are closed. If when the $CP_2$ pulse is applied, the relay is deenergized, the pulse will pass through the upper contacts of switch 92 and appear at the "0" state terminal. So long as $CP_2$ pulses are applied to the switch 92 and no complement pulses are applied to the switch 93, pulses will continue to appear at the "0" state terminal.

Assume now, that with the storage element 90 in the "0" state and the relay 91 de-energized, a complementing pulse is applied to switch 93. Such pulse passes through the upper contacts, is applied through the "1 set Or" gate to the "1" input terminal of the storage element 90, and switches the storage element to the "1" state. The pulse also appears at the "sum" terminal to indicate that the storage element is being switched from the "0" to the "1" state. The next $CP_1$ pulse which is applied to the "0" input terminal of the storage element 90 will read the stored "1" and switch the storage element 90 back to the "0" state. When the storage element 90 switches, a voltage is produced which energizes the relay. The following $CP_2$ pulse will then find the lower contacts of switch 92 closed and the upper contacts open. Thus, the $CP_2$ pulse will appear at the "1" state terminal to signify that the storage element was in the "1" state. The pulse appearing at the "1" state terminal is also applied through the "1 set Or" gate to the "1" input terminal of the storage element 90 and switches the storage element from the "0" state, in which it was placed by the $CP_1$ pulse, back to the "1" state. This closes the loop cycle and, so long as no complement pulses are applied, the system will now remain in the "1" state, with a series of pulses appearing at the "1" state terminal at the rate of application of the clock pulses. If the storage element 90 is of a non-volatile type, such as a square-hysteresis-loop magnetic core, the operation of the circuit may be interrupted, as by removing the power, without losing the information stored, so that when the power is re-applied the information is again available. Thus, push-button operation of the circuit is possible.

It will be noted that when the system is in the "1" state, and pulses are being delivered from the "1" state terminal at the clock rate, the storage element 90 is actually being shifted from the "1" state to the "0" state by each $CP_1$ pulse and then shifted back from the "0" to the "1" state by the following $CP_2$ pulse.

If, while the system is in the "1" state just described, a complement pulse is applied coincident with a $CP_2$ clock pulse, such complement pulse will find the storage element switching from the "1" to the "0" state. Thus, the relay will be in energized condition and the lower contacts of switches 92 and 93 will be closed. The complement pulse will, therefore, pass through the lower contacts of switch 93 to the "0 set Or" gate and then to the inhibit gate 94. The inhibit gate 94 will thereupon prevent the $CP_2$ pulse from passing from the "1 set Or" gate to the "1" input terminal of the storage element. Accordingly, the storage element will remain in the "0" state for the next $CP_1$ pulse, and the relay will be in unenergized condition.

The "0 set" and "1 set" terminals indicated in Fig. 3 are for the application of pulses to set the system unconditionally, either to the "0" or to the "1" state. It will be noted that the state of the system is given by a series of pulses coming from the "0" state or "1" state terminals. The state as read at these terminals will change one clock pulse after the system has been triggered by a complement pulse or a set pulse. It is particularly to be noted that additional contact units may be stacked on the relay unit, and that when so stacked, these additional units will not change their states until after the clock period when the complement or set pulses are applied. This is an important feature since it means that a given pulse will not be switched from one circuit to another while it is being applied. The information available at the "carry" and "sum" terminals, which are the output terminals of switch 93, are very useful for counting purposes since it is desirable to know the state to which a complementing pulse is sending the system. If the complement pulse is delivered from the normally-closed contacts of the switch 93, it means that the system will be changing from the "0" to the "1" state. Thus, this pulse is identified as the "sum" terminal. If, on the other hand, a complement pulse is delivered through the contacts of switch 93 which are normally open, it means that the complement pulse found a system in the "1" state and will change it to the "0" state. This corresponds to the production of a "carry" digit and so the terminal associated with the normally-open contacts of switch 93 is identified as a "carry" terminal. The only inherent delay in carry propagation will then be that due to the switch contacts, The inhibit operation represented by the triangle 94 in the logic circuit of Fig. 3 is shown to be accomplished in one particular way in the circuit of Fig. 1. It should be understood that the method shown in Fig. 1 is merely one of a number of ways in which the inhibit operation may be accomplished. The particular technique used in Fig. 1 consists in shunting the transistor 15 across the temporary storage capacitor 80. When the transistor 15 is driven into saturation by a signal from the "0 set Or" gate, it presents a low impedance across the capacitor 80 and dissipates the information before it can trigger the transistor 12. This form of inhibit allows considerable variation in timing between the complement pulse and the $CP_2$ pulse. It is possible, for example, for a "1 set" pulse to be applied to the "1 set" terminal and then wiped out in one clock period.

The circuit of the invention has many applications. It may be used to mechanize an accumulator, a decimal counter, and various other control and arithmetic units useful in digital computers.

What is claimed is:

1. In combination: first and second double-throw electronic switches, each having two output terminals, each of said switches comprising a pair of pulse transformers having primary and secondary windings, each of said transformers having a diode connected in series with its primary winding; a flip-flop circuit having two output terminals and comprising first and second junction transistors, means for connecting a source of first D.-C. voltage for reverse biasing the output junctions of said transistors, and means for connecting a second source of D.-C. voltage for forward biasing the input junction of said first flip-flop transistor, whereby said first flip-flop transistor is normally conductive, whereby said flip-flop is normally in one of its two stable states; means for connecting each output terminal of said flip-flop circuit to a different diode of each of said first and second diode-transformer switches to bias differently said diodes and thereby to control the condition of said switches according to the state of said flip-flop; a control circuit comprising a single square-loop magnetic core and first and second control transistors, said core having a plurality of windings, each of said control transistors having a different one winding of said core in its output circuit and another in its input circuit, the output and input windings of each control transistor being regeneratively coupled; means for applying a first pulse to said first control transistor to trigger said transistor into regenerative action to drive current through its output winding in a direction to establish a magnetizing force of a polarity and magnitude to switch said core to one state of remanence; means, comprising an additional winding on said core connected in the input circuit of said second flip-flop transistor and responsive to the switching of said core to said one state of remanence, for triggering said second flip-flop transistor into conduction, thereby to switch said flip-flop and thereby to reverse the conditions of said first and second switches; means for applying a second pulse, which lags that of said first pulse by a time interval not greater than the switching time of said control circuit to said first switch to pass a signal to one of its two output terminals according to the state of said flip-flop; means, including a storage capacitor, for applying the signal developed at one of the two output terminals of said first switch to said second control transistor and effective upon termination of the regenerative action of said first control transistor to trigger said second control transistor into regenerative action thereby to drive current through its output winding in a direction to establish a magnetizing force of the other polarity and thereby to drive said core to its other state of remanence; means for applying to said second switch a complementing pulse substantially coincident with said second pulse to pass a signal to one of the two output terminals of said second switch according to the state of the flip-flop; means, including said storage capacitor, for applying any signal developed at one of said output terminals of said second switch to said second control transistor for triggering said second control transistor into regenerative action upon termination of the regenerative action of said first control transistor; an inhibit circuit connected to said second control transistor; and means for applying any signal developed at the other output terminal of said second switch to said inhibit circuit to prevent triggering of said second control transistor by said second pulse upon termination of the regenerative action of said first control transistor.

2. In combination: a flip-flop normally residing in one of its two stable states; first and second diode-transformer switches each having two output terminals; means connecting the flip-flop to said first and second switches to control the condition of said switches according to the state of said flip-flop; a control circuit comprising a single square loop core having a plurality of windings and a pair of control transistors each having a winding of said core in its output circuit and also in its input circuit; a source of pairs of pulses, the second pulse of each pair lagging behind the first pulse of the pair by a time interval which is within the switching time of said control circuit; a source of complement pulses of like polarity, the occurrence of each of said complement pulses being substantially coincident with the second pulse of a pulse pair though ordinarily less frequently; means for applying the first pulse of a pulse pair to one of said control transistors for switching said core to one of its two states; means responsive to the switching of said core for triggering said other flip-flop transistor into conduction, thereby to reverse the state of said flip-flop and thereby to reverse the condition of said first and second switches; means for applying said second pulse of a pulse pair to said first switch to pass a signal to one of its two output terminals, according to the condition of said switch; means including a delay device for applying the signal from said one of said two output terminals of said first switch to said other control transistor to trigger said transistor into conduction upon termination of the switching of said core to said one of its two states; means for applying a complement pulse to said second switch for passing a signal to one of its two output terminals, according to the state of said flip-flop; means, including said delay device, for applying a signal from one of said two output terminals of said second switch to said other control transistor to trigger said transistor into conduction upon termination of the switching of said core to said one of its two states; an inhibit circuit; and means for applying a signal from the other output terminal of said second switch to said inhibit circuit to prevent said other control transistor from being triggered into conduction upon termination of the switching of said core to said one of its two states.

3. In combination: first and second diode-transformer switches, each switch comprising two pulse transformers, each transformer having a diode in series with its primary winding; a transistor flip flop controlling the bias on the diodes and thereby controlling the condition of the diode-transformer switches; biasing means for holding said flip flop in one of its two bistable states; a control circuit for said flip flop, said control circuit comprising a single square-loop core having a plurality of windings and a plurality of transistors for driving current through selected ones of said core windings to switch said core to a selected remanent state; a first source of pulses for triggering one of said transistors to set said core in one of its two states; a second source of pulses; means for aplying said second-source pulse to said first switch to drive current through the primary winding of one of its transformers when said flip flop is in one state and through the primary winding of the other of its transformers when the flip flop is in the other state; a storage capacitor; means connecting the secondary of the other of said first-switch transformers to said storage capacitor; means utilizing the charge on said storage capacitor to trigger the other of said transistors to switch said core from said one state to its other state; a third source of pulse; means for applying said third-source pulse to said second switch to drive current through the primary winding of one of its transformers when said flip flop is in one state and through the primary winding of the other of its transformers when the flip flop is in the other state; means connecting the secondary of the other of said second-switch transformers to said storage capacitor; an inhibit circuit; and means connecting the secondary of said one of said second-switch transformers to said inhibit circuit to prevent the charge on said storage capacitor from triggering the other of said transistors, thereby to prevent the switch of said core from its said one to its said other state.

4. A relay storage device comprising: a pair of electronic switches, each switch comprising a pair of pulse transformers, each transformer having a diode in series with its primary winding, each switch having a pair of output terminals; means, including a flip-flop circuit, for controlling the bias condition of said diodes and thereby controlling the condition of said switches; means, including a single square-loop magnetic core, for storing information; means, including a source of pairs of pulses time-paced by an interval which is within the switching time of said core, for reading out and reading in information from and to said core, said read-out and read-in means including means responsive to the first pulse of a pair for maintaining said core in or switching said core to the "0" state and means responsive to the application of the second pulse of said pair to one of said switches, and effective only if said core switches in response to said first pulse, for switching the core back to the "1" state; means responsive to the switching of said core to the "0" state in response to said first pulse of said pair for developing a "1" signal at one of the output terminals of said one switch and means responsive to non-switching of said core for developing a "0" signal at the other output terminal of said one switch; means responsive to the application of a complement pulse to said second switch, and effective only if said core switches to said "0"

state in response to said first pulse of said pair, for developing a "carry" signal at one of the output terminals of said second switch and effective if said core does not switch in response to said first pulse for developing a "sum" signal at the other of said output terminals of said second switch; means responsive to said "sum" signal for switching said core from the "0" to the "1" state; and means responsive to said "carry" signal for inhibiting the switching of said core to the "1" state in response to the second pulse of said pair.

5. In combination: a single square-loop magnetic core capable of residing in either a "0" state or a "1" state and of being switched from one to the other; a source of pairs of pulses, the second pulse of said pair lagging behind the first pulse by a time interval which is within the switching time of said core; first winding means coupled to said core and responsive to the first pulse of a pair for exerting a magnetizing force capable of switching said core to the "0" state; first pulse-transformer switching means responsive to the second pulse of said pair, and effective when said core does not switch in response to said first pulse, for developing a "0" output signal, and effective when said core switches from the "1" to the "0" state in response to said first pulse, for developing a "1" output signal; means, including delay means and second winding means coupled to said core, for utilizing said "1" output signal to switch said core from the "0" state back to the "1" state; second pulse-transformer switching means responsive to a complement pulse applied thereto substantially coincident with the application of said second pulse of said pair to said first pulse-transformer switching means, and effective when said core does not switch in response to said first pulse, for developing a "sum" output signal, and effective when said core switches from the "1" to the "0" state in response to said first pulse, for developing a "carry" output signal; means, including said delay means and said second winding means coupled to said core, for utilizing said "sum" output signal to switch said core from the "0" to the "1" state; and inhibit means for utilizing said "carry" output signal to inhibit said "1" output signal from switching said core from said "0" to said "1" state.

6. In combination: a single magnetic core capable of assuming either of two stable states of magnetic remanence one of which represents the "0" state and the other of which represents the "1" state; first and second transistors each having input and output circuits, each of said input and output circuits including a winding coupled to said core, the input-circuit and output-circuit windings of each said transistor being regeneratively coupled; third and fourth transistors each having input and output circuits, each of the input circuits of said third and fourth transistors including a winding coupled to said core; means for applying a direct-current potential to the output-circuit electrodes of said third and fourth transistors; means for applying a biasing potential to an input-circuit electrode of said fourth transistor for biasing said fourth transistor into conduction; first, second, third and fourth pulse transformers; first, second, third and fourth diodes each having a similar electrode connected to one end of the primary winding of a corresponding one of said pulse transformers; means connecting the other electrode of each of said first and third diodes to an output-circuit terminal of said third transistor and means connecting the other electrode of each of said second and fourth diodes to an output electrode of said fourth transistor, whereby the potential at the output electrode of said respective transistor, as determined by the conduction state of said transistor, determines the bias on the diodes connected thereto; means for applying a first voltage pulse across the input-circuit electrodes of said first transistor to forward bias said first transistor into conduction, thereby to exert a magnetizing force on said core tending to switch said core to the "0" state, the input-circuit windings of said third and fourth transistors being so poled that in response to the actual switching of said core from the "1" to the "0" state in response to said first pulse, said third transistor is biased into conduction and said fourth transistor is biased into non-conduction, thereby to reverse the bias previously existing on the diodes connected to the output-circuit electrodes of said third and fourth transistors; means for applying, within the switching time of said core, a second voltage pulse across third and fourth current paths connected in parallel, said third path comprising in series the primary winding of said third transformer, said third diode and the output circuit of said third transistor and said fourth path comprising in series the primary winding of said fourth transformer, said fourth diode and the output circuit of said fourth transistor, thereby to drive substantial current through but one of said third and fourth paths according to the bias on the diode included in said path, thereby to produce either a "1" or a "0" output signal at the terminals of the secondary of said third or fourth pulse transformers respectively; delay means for applying any "1" output signal across the input-circuit electrodes of said second transistor for biasing said second transistor into conduction but not until termination of the switching of said core from said "1" state to said "0" state, thereby to exert a magnetizing force on said core to switch said core back to said "1" state; means for selectively applying, concurrently with said second voltage pulse, a third voltage pulse across first and second current paths connected in parallel, said first path comprising in series the primary winding of said first transformer, said first diode and the output circuit of said third transistor, said second path comprising in series the primary winding of said second transformer, said second diode and the output circuit of said fourth transistor, thereby, in response to such third pulse, to drive substantial current through but one of said first and second paths according to the bias on the diode included in said path, thereby to produce either a "carry" or a "sum" output signal at the terminals of the secondary of said first and second pulse transformers respectively; means, including said delay means, for applying any "sum" output signal across the input-circuit electrodes of said second transistor for biasing said second transistor into conduction, thereby to switch said core from said "0" to said "1" state; and inhibit means coupled to said delay means and to said "carry" output terminal for inhibiting, in response to any "carry" output signal, the biasing into conduction of said second transistor, thereby to inhibit the switching of said core from said "0" back to said "1" state.

7. Apparatus as claimed in claim 6 characterized in that said delay means comprises a storage capacitor and in that said inhibit means comprises a fifth transistor for discharging said storage capacitor.

References Cited in the file of this patent

UNITED STATES PATENTS

| | | |
|---|---|---|
| 2,772,370 | Bruce et al. | Nov. 27, 1956 |
| 2,785,236 | Bright et al. | Mar. 12, 1957 |
| 2,794,130 | Newhouse | May 28, 1957 |
| 2,798,169 | Eckert | July 2, 1957 |
| 2,809,303 | Collins | Oct. 8, 1957 |